United States Patent
Nguyen et al.

(10) Patent No.: US 10,462,423 B1
(45) Date of Patent: Oct. 29, 2019

(54) VIRTUAL ON-SET COMMUNICATION PLATFORM FOR ON-SET CONTRIBUTORS

(71) Applicant: SHUTTERSTOCK, INC., New York, NY (US)

(72) Inventors: Stephanie Nguyen, London (CA); Reuben Tozman, Scarborough (CA); Nael Shawwa, Toronto (CA)

(73) Assignee: Shutterstock, Inc., New York, NY (US)

( * ) Notice: Subject to any disclaimer, the term of this patent is extended or adjusted under 35 U.S.C. 154(b) by 0 days.

(21) Appl. No.: 16/175,444

(22) Filed: Oct. 30, 2018

(51) Int. Cl.
  *H04N 7/14* (2006.01)
  *G06Q 10/10* (2012.01)
  *G06F 3/0484* (2013.01)

(52) U.S. Cl.
  CPC .......... *H04N 7/147* (2013.01); *G06F 3/0484* (2013.01); *G06Q 10/103* (2013.01)

(58) Field of Classification Search
  None
  See application file for complete search history.

(56) References Cited

U.S. PATENT DOCUMENTS

| | | | |
|---|---|---|---|
| 2004/0246332 A1* | 12/2004 | Crouch | H04L 12/1822 348/14.08 |
| 2007/0160076 A1* | 7/2007 | Faber | H04L 63/083 370/461 |
| 2017/0374194 A1* | 12/2017 | Sales | H04L 61/1594 |
| 2018/0152665 A1* | 5/2018 | Zuo | H04N 7/147 |

* cited by examiner

*Primary Examiner* — Amal S Zenati
(74) *Attorney, Agent, or Firm* — McDermott Will & Emery LLP

(57) ABSTRACT

Methods and systems for virtual on-set communication are provided. In one aspect, a method includes receiving, from a device of a first user, an input indicating that the first user is ready to start working on a project associated with the first user. The method also includes identifying, based on the project associated with the first user, a second set of users associated with the project. The method also includes generating a session identifier for a communication channel between the first user and one or more users of the second set of users. The method also includes generating messages for the communication channel, wherein the messages include a link to the communication channel. The method also includes transmitting the messages to the one or more users of the second set of users. The method also includes receiving stream of images from the first user's device while the stream of images are being captured, transmitting the stream of images to the second set of users, receiving, from the second set of users, messages related to the stream of images.

19 Claims, 4 Drawing Sheets

_US 10,462,423 B1_

VIRTUAL ON-SET COMMUNICATION PLATFORM FOR ON-SET CONTRIBUTORS

TECHNICAL FIELD

The present disclosure generally relates to communications between users, and more specifically relates to virtual user interaction and communication between users.

BACKGROUND

On a project (a "freelance project") that involves one or more persons from one entity and another person who is independent of that entity (a "freelance content producer," or "freelance content contributor," or "freelancer"), it is generally difficult to schedule a time in advance at which the project will commence and a time at which the stakeholders of the project, such as the freelance content producer and one or more persons at an entity that hired the stakeholder, can meet to successfully coordinate on the execution of the project. Furthermore, the freelance content producer or contributor and the stakeholders at the entity are generally not present in the same location during the execution of the project, and rely upon communication protocols of computing devices to communicate with each other and to coordinate on the execution of the project. This results in poor coordination on the execution of the project and increasing the cost of the project.

SUMMARY

The present disclosure provides for a platform for providing enhanced communication between various stakeholders of a freelance project in real-time, such as while on-set, and selects a communication channel determined to be most efficient in successfully coordinating execution of the project.

Accordingly to one embodiment of the present disclosure, a computer-implemented method is provided. The method includes receiving, from a device of a first user, an input indicating that the first user is ready to start working on a project associated with the first user. The method also includes identifying, based on the project associated with the first user, a second set of users associated with the project. The method also includes generating a session identifier for a communication channel between the first user and one or more users of the second set of users. The method also includes generating messages for the communication channel, wherein the messages include a link to the communication channel. The method also includes transmitting the messages to the one or more users of the second set of users. The method also includes receiving one or more stream of images from the device of the first user while the one or more stream of images are being captured by an image capturing device of the first user. The method also includes transmitting the one or more stream of images to the second set of users. The method also includes receiving, from a device of a user from the second set of users, one or more messages related to the one or more stream of images.

Accordingly to one embodiment of the present disclosure, a non-transitory computer readable medium is provided including instructions that, when executed by a processor, cause the processor to perform a method. The method includes receiving, from a device of a first user, an input indicating that the first user is ready to start working on a project associated with the first user. The method also includes identifying, based on the project associated with the first user, a second set of users associated with the project. The method also includes generating, a session identifier for a communication channel between the first user and one or more users of the second set of users. The method includes selecting, based on a strength of a communication signal between the device of the first user and a communication service provider, a mode of communication for the communication channel. The method also includes generating messages for the communication channel, wherein the messages include a link to the communication channel. The method also includes transmitting the messages to the one or more users of the second set of users. The method also includes receiving one or more stream of images from the device of the first user while the one or more stream of images are being captured by an image capturing device of the first user. The method also includes transmitting the one or more stream of images to the second set of users. The method also includes receiving, from a device of a user from the second set of users, one or more messages related to the one or more stream of images.

According to one embodiment of the present disclosure, a system is provided that includes means for storing instructions, and means for executing the stored instructions that, when executed by the means, cause the means to perform a method. The method includes receiving, from a device of a first user, an input indicating that the first user is ready to start working on a project associated with the first user. The method also includes identifying, based on the project associated with the first user, a second set of users associated with the project. The method also includes generating a session identifier for a communication channel between the first user and one or more users of the second set of users. The method also includes generating messages for the communication channel, wherein the messages include a link to the communication channel. The method also includes transmitting the messages to the one or more users of the second set of users. The method also includes receiving one or more stream of images from the device of the first user while the one or more stream of images are being captured by an image capturing device of the first user. The method also includes transmitting the one or more stream of images to the second set of users. The method also includes receiving, from a device of a user from the second set of users, one or more messages related to the one or more stream of images.

According to one embodiment of the present disclosure, a system is provided including a memory storing sequences of instructions, and a processor configured to execute the sequences of instructions, which when executed, causes the processor to perform receiving, from a device of a first user, an input indicating that the first user is ready to start working on a project associated with the first user. The execution of the sequences of instructions also causes the processor to perform identifying, based on the project associated with the first user, a second set of users associated with the project. The execution of the sequences of instructions also causes the processor to perform generating a session identifier for a communication channel between the first user and one or more users of the second set of users. The execution of the sequences of instructions also causes the processor to perform selecting, based on a listing of communication mode preferences associated with the first user, a mode of communication for the communication channel. The execution of the sequences of instructions also causes the processor to perform generating messages for the communication channel, wherein the messages includes a link to the communication channel. The execution of the sequences of instructions also causes the processor to perform transmitting the messages to the one or more users of the second set of users. The execution of the sequences of instructions also causes the processor to perform receiving one or more stream of images from the device of the first user while the one or more stream of images are being captured by an image capturing device of the first user. The execution of the sequences of instructions also causes transmitting the one or more stream of images to the second set of users. The execution of the sequences of instructions also causes receiving, from a device of a user from the second set of users, one or more messages related to the one or more stream of images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
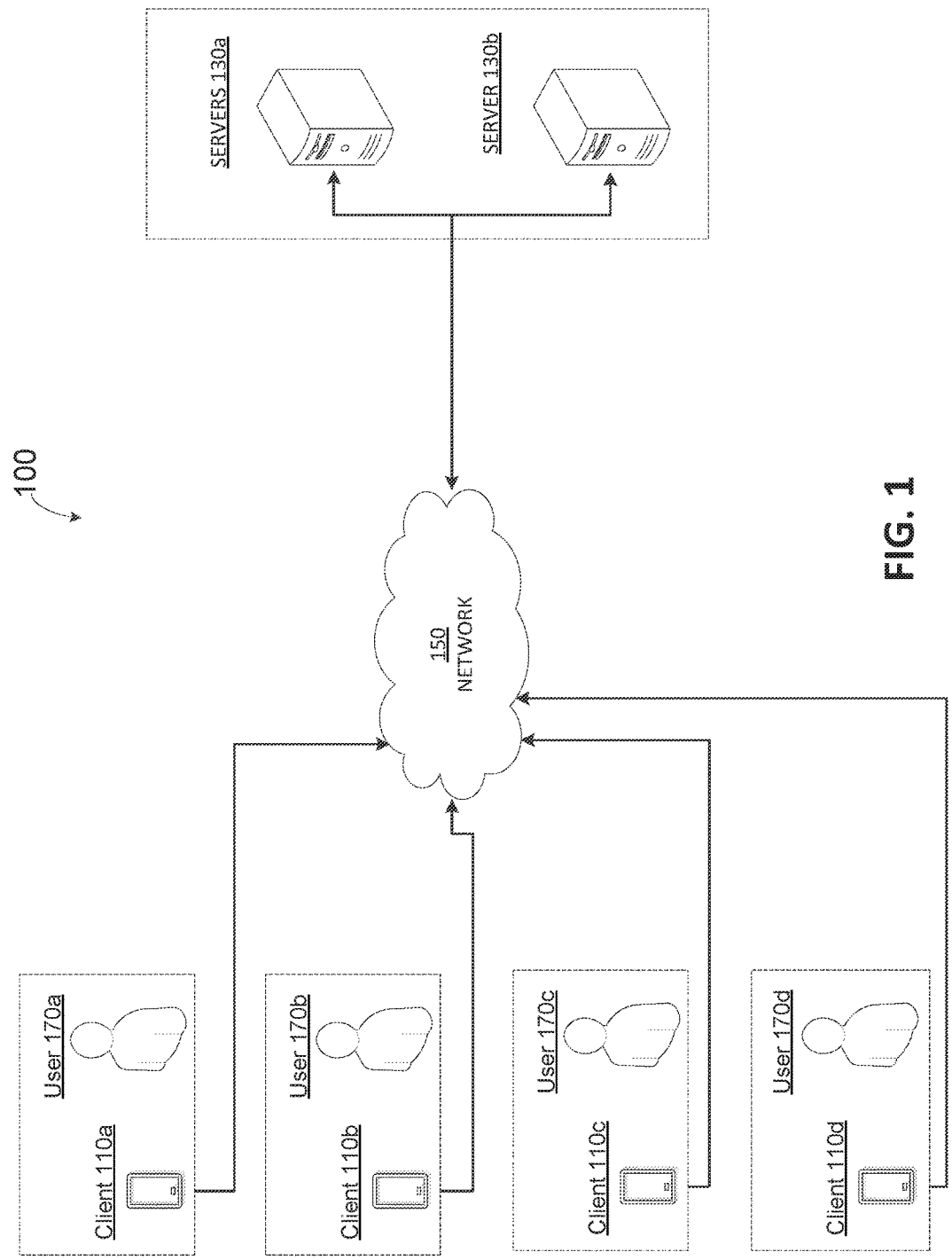
FIG. 1 illustrates an example architecture for a virtual on-set communication platform.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

In a freelance environment, there are lots of variables that dictate when a freelance producer/contributor is able to produce content for an entity that hired the freelancer. One of the major factors that dictate when a freelancer produces the content is the availability of the freelancer. Therefore, for the entity that hired the freelancer and for the freelancer, there is no scheduled time at which the content will be produced. Thus it is difficult to schedule a time in advance for the parties to communicate in real-time. The inability to schedule a time in advance leads to asynchronous communication between the parties, which leads to delays in receiving responses from one party to another party. Such failure in real-time communication often results in an entity to lack control over the production of the content, which generally results in reproduction of the content and increases in the cost of production of the content.

The techniques and methods described herein provide for a virtual on-set communication platform for communication between the content producers/contributors and other stakeholders of the project. The techniques and methods described herein also provide for the content producer/contributor to provide an input indicating that he or she is ready to start working on a project. After receiving the input, the techniques and methods described herein generate a communication session for the project and transmit messages to the associated users of the project. The generation of the communication session may include establishing a communication channel between the content producers/contributors and other stakeholders of the project. A mode of communication may be selected for the communication session. The techniques and methods described herein also provide for changing the mode of communication during the communication session based on a strength of a communication signal between a device of the content producer/contributor and a communication service provider. As a result, allowing content producers/contributors of a project and other stakeholders are permitted to communicate in real-time without scheduling a meeting in advance and selecting a best mode of communication for the project.

The techniques, methods, and systems described herein address a problem in virtual scheduling and communication systems, efficient communication between computing devices, such as personal computing devices, smartphones, and the like, used for collaboration on a content project, which is a problem specifically arising in the realm of computer technology, by providing a solution also rooted in computer technology, namely by reducing the number of messages transferred between the computing devices and networking devices, and by selecting appropriate mode of communication and communication protocols for transferring of messages or data between the computing devices. The disclosed techniques, methods, and systems described herein reduce the amount of data carried over a network by allowing for real-time communication between computing devices, which improves efficiency of a network that communicatively couples each of the computing devices with each other. The disclosed techniques, methods, and systems described herein provide improvements to the functioning of the computing devices itself because it saves data storage space and reduces cost of system resources. Specifically, with the reduction of messages received and transferred, less data storage space is consumed. The reduction in messages transferred between computing devices results in the consumption of fewer computing resources, such as fewer processor cycles, which improves the efficiency of the processor and increases overall speed of execution of various computing tasks by the computing device.

Example System Architecture

FIG. 1 illustrates an example architecture 100 for a computing platform for providing enhanced communication between users virtually located on-set. The architecture 100 includes clients 110a, 110b, 110c, 110d, generally referred to herein as clients 110, and servers 130a, 130b, generally referred to herein as servers 130 connected over a network 150. Users 170a, 170b, 170c, 170d, generally referred to herein as users 170, interact with respective clients 110 and transmit data, including instructions, to servers 130.

Servers 130 may be configured to be cloud computing servers that provide platform-as-a-service (PaaS) and/or software-as-a-service (SaaS) services. Examples of platforms and/or software hosted by the servers 130 include, but are not limited to, applications configured for communication, generally referred to herein as "communication application," between two or more users, including data related to users 170. Examples of data related to users 170 include, but are not limited to, users 170 account information, preferences associated with the users 170, projects associated with the users 170, and the like. Preferences data associated with users 170 include selections made by users 170 for a preferred type of communication within a particular instance of a communication application. For example, if a user 170 provides an input to a client 110 that video-based communication is the preferred method of communication, then such preference is associated with an identifier for the user 170, such as account identifier of the user 170, and is stored within a data storage unit of the server 130 or a data storage unit coupled to the server 130. Similarly, a user 170 may provide one or more inputs to a client 110 that specifies a prioritized ranking for the methods of communication, such as audio-based communication, text-based communication, video-based communication, and the specified ranking of the methods of communication is associated with the user 170 and stored in a data storage unit of the server 130 or a data storage unit coupled to the server 130. In some implementations, for purposes of load balancing, multiple servers 130 may host the above described applications and data. The servers 130 can be any devices having an appropriate processor, memory, and communications capability for hosting data and applications as a service.

The clients 110 include one or more computing devices, including but not limited to, mobile devices (e.g., a smartphone or PDA), tablet computers, laptop computers, desktop computers, and/or other devices capable of running a communication application. In some implementations, the clients 110 may include a storage medium that includes logic to provide authentication of a user 170 credentials to provide access to the communication application. In some implementations, the communication application provided by the client 110 may be executable by one or more processors of the client 110. The communication application or instances of communication application may each individually be stored on media, such as flash memory, steady-state memory, removable media storage, or other storage media. In some implementations, instances of the communication application may be downloaded and stored on storage media of the clients 110. The clients 110 are configured to transmit data to the servers 130 in response to inputs received from users 170. In some implementations, clients 110 are configured to download data associated with the user 170 and stored on the servers 130, upon starting the instance of the game application being hosted on the client 110.

A communication application should be understood to include software code that the client 110 uses to provide an interface, such as a graphical user interface (GUI), with which a user interacts. A communication application may include software code that informs the client 110 of processor instructions to execute, but may also include data used during communication between two or more users 170, such as data relating to the users account names, identifiers, login status, whether one or more users 170 joined a communication channel created for the communication between the two or more users 170, whether one or more users 170 accepted the invitation to join the communication channel, icons selected by users 170 to represent their online avatars, and other such data. A user 170 interacts with the communication application and the client 110 through user input/output (I/O) devices. The clients 110 may each execute a separate instance of a game application. Additional details of clients 110 are described below with reference to FIG. 2.

The clients 110 and the servers 130 are communicatively coupled to each other over the network 150. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Virtual On-Set Communication Platform

Figure 2:
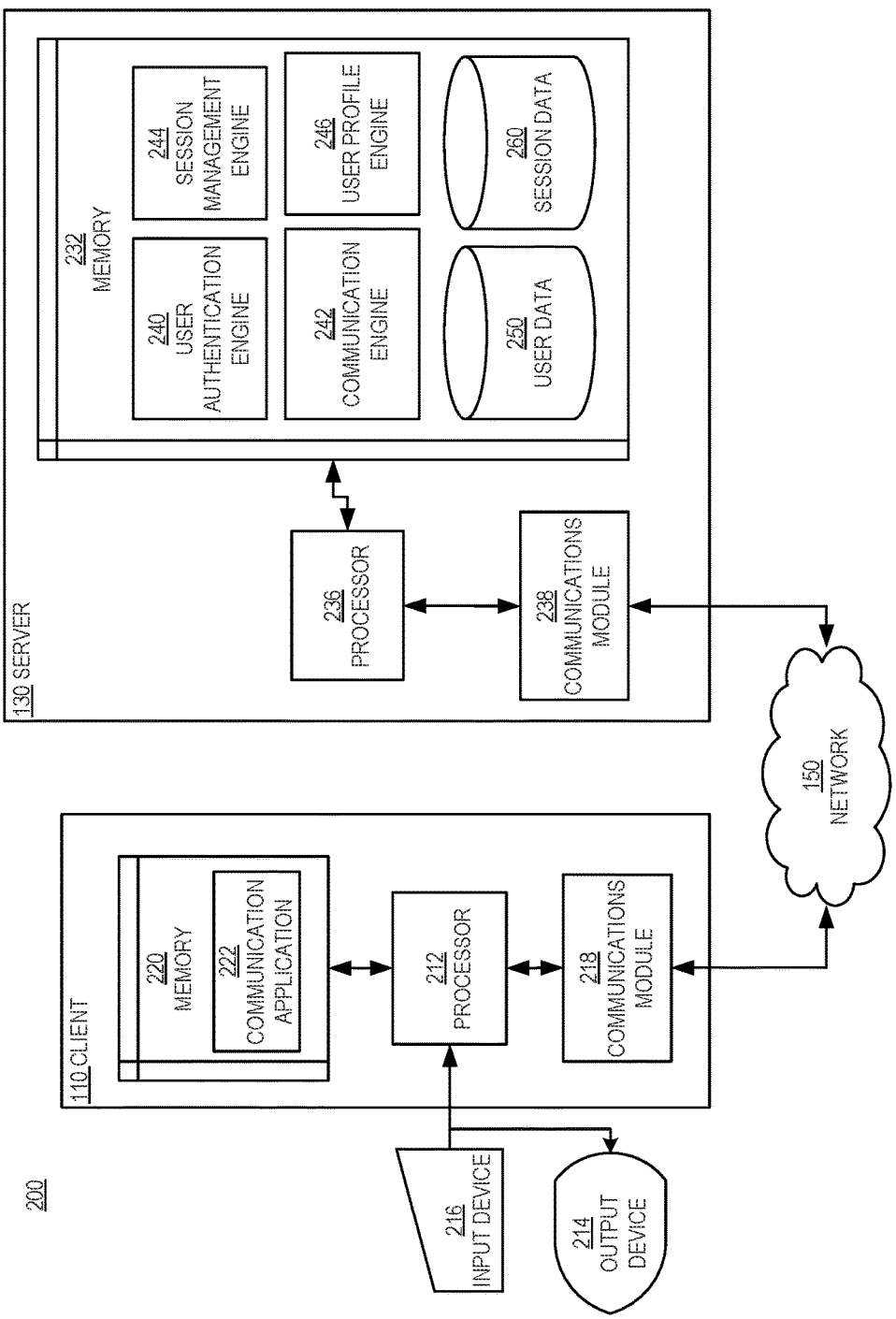
FIG. 2 is a block diagram illustrating the example clients and servers from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a user authentication engine 240, a communication engine 242, and a session management engine 244. The processor 236 of the server 130 is configured to execute instructions, such as instructions physically coded into the processor 236, instructions received from software in the memory 232, or a combination of both. The user authentication engine 240 receives inputs from users 170 via clients 110 over the network 150. Examples of inputs received by the user authentication engine 240 include, but are not limited to, receiving user input data related to user login information, such as a username, a password, user preferences, project selections, and the like. User input data includes data related to inputs from a user that specify that the user is ready to start working on a project. Such input data will be referred to herein as "check-in." The user preferences may include, but are not limited to, communication mode preferences. Communication modes include, but are not limited to, video communication, audio communication, text communication, and the like. In some implementations, a communication mode may include combination modes of one or more of the communication modes, such as video communication and text communication, audio communication and text communication, and the like. The user authentication engine 240 is configured to save the users' selections and provide the data to other engines within memory 232, such as the session management engine 244, communication engine 242, and/or save data related to the user's inputs in a data storage unit, such as user data repository 250.

The user profile engine 246 is configured to generate and update a profile for a user 170 and store the profile data in a data storage unit, such as the user data repository 250. The profile of a user may include data related to login information of a user 170, such as a username, password, and the like. The profile of a user may also include data related to a user's communication mode preference and a ranking among the preferred modes of communication. For example, if a user, such as user 170a, specifies a preference for video communication and audio communication, and specifies that a video communication is more highly preferred than an audio communication, then the user profile engine 246 may store the preference data for the video communication and the audio communication, along with a ranking for video communication preference that is higher than the audio communication preference. The user profile engine 246 may be configured to provide the communication mode preferences information of a user 170 to session management engine 244.

The session management engine 244 is configured to generate communication sessions between two or more users 170. The session management engine 244 is configured to generate a communication session in response to receiving a user input that indicates that a user 170, such as user 170a, is ready to begin a project associated with the user 170a. The session management engine 244 is configured to, based on a project identifier of the project or description of the project, identify all users associated with the project with which the user 170 that provided the input that he or she is ready to begin the project is associated. In some implementations, the session management engine 244 may receive a project identifier of a project for which a user 170 provided an input that he or she is ready to start working on the project, and the session management engine 244 may identify all users 170 associated with that project based on the project identifier of the project. In some implementations, the session management engine 170 may send a request to the user profile engine 246 to receive the project identifier information. In some implementations, the user 170 that provided the input that he or she is ready to start working on the project may provide an input specifying a project for which he or she is ready to start working on and a processor 236 may identify a project identifier for that project based on the user input and a data storage unit, such as the user data 250, that stores information on projects associated with a user 170.

The session management engine 244 generates a communication session by establishing a communication channel between two or more of the identified users 170 of the project. For each communication session between two or more users 170, the session management engine 244 generates a unique session identifier. In some implementations, the session management engine 244 associates each session identifier with a project identifier of a project, and stores the association in a data storage unit, such as session data repository 260. In some implementations, the session management engine 244 may record communication during a communication session between two or more users 170 and store the recorded communication data in a data storage unit, such as session data repository 260. In some implementations, the session management engine 244 may associate the unique session identifier with the recorded communication data and store the association between the unique session identifier and the recorded communication data in a session data repository 260. In some implementations, the session management engine 244 can be configured to retrieve recorded communication data from a session data repository 260 using the associated unique session identifier.

The session management engine 244 establishes a communication channel based on the communication mode preferences of the user 170 that provided the input that he or she is ready to start working on the project. For example, if the communication mode preferences of the user 170a are video communication and audio communication, then the session management engine 244 establishes a communication channel with video communication enabled between the two or more identified users of the project. In implementations where a ranking is specified among the communication mode preferences, then the session management engine 244 establishes a communication channel with the communication mode that is ranked highest enabled.

The session management engine 244 may be configured to receive location data of the user 170 that provided the input that he or she is ready to start working on the project, and the session management engine 244 may determine the mode of communication for the communication channel based on the location data of that user 170 and the communication mode preferences of that user 170. The location data of the user 170 may be based on the location of the client device 110 being used by the user 170. In some implementations, the server 130 may include a data storage unit that includes a best communication mode for different locations, and the session management engine 244 may be configured to identify a corresponding best mode of communication for a location of the user 170 using the data in the data storage unit.

The session management engine 244 is configured to receive data related to strength of a communication signal between a communication signal provider and the client device 110 of the user 170 that provided the input that he or she is ready to start working on the project. Examples of communication signal providers include, but are not limited to, telecommunications network providers, such as a cellular telephone network provider, Internet service providers, and the like. The session management engine 244 is configured to determine the communication mode for the communication channel based on the communication signal strength data received by the client device 110 of that user 170 and the communication mode preferences of that user 170. In some implementations, the session management engine 244 is configured to determine if the communication signal strength data is below or equal to a threshold communication signal strength data, and if it is below or equal to a threshold communication signal strength data, then the session management engine 244 is configured to change the mode of communication according to the signal strength data. In some implementations, the session management engine 244 is configured with a set of rules that specify different modes of communication for different threshold levels of signal strength data.

The session management engine 244 generates messages for the other identified users 170 associated with the project on which a user 170 provided the input that he or she is ready to start working, and transmits the messages to the users 170 associated with the project. The messages include a link to the communication channel and to notify the other identified users 170 that the user 170 that provided the input that he or she is ready to start working on a project is ready to start working on the project. The processor 236 transmits the messages to the other identified users 170, based on user identifiers of the other identified users 170, such as user-names or telephone numbers associated with the other users 170. The messages may be presented in a graphical user interface (GUI). The link to the communication channel within the message may be presented in a graphical icon, which may be configured to receive an input from a user.

The communication engine 242 is configured to present GUIs configured to receive and display communications, referred to herein as "communication GUI," from one user 170 to another user 170 that are identified as users associated with a project. The communication engine 242 is configured to present communication suggestions to the users based on the messages being transmitted between the users 170, duration of the communication, time of the day at which the communication is occurring, and the like. For example, the communication engine 242 may present a "Hello!" message suggestion to the users at the beginning of a communication session. Similarly, the communication engine may present a "Goodnight!" message suggestion to the users if any of the other users 170 in the communication session sent a "Goodnight" message. The communication engine 242 may present other types of messages that indicate an action or an event that occurs during the communication session between the users. In some implementations, the communication engine 242 receives instructions from other modules or engines within server 130.

The client 110 includes a processor 212, the communications module 218, and the memory 220 that includes a communication application 222. The communication application 222 may be a streaming engine and/or simulation engine, or physically coded instructions that execute a communication application, which when executed presents graphical user interfaces (GUI) for logging into the application, providing inputs to the server 130 that the user is ready to start working on a project, receiving messages from server 130, communicating with other identified users 170 of the project via a communication channel in a mode of communication selected for that communication session. The client 110 also includes an input device 216, such as a keyboard, mouse, touchscreen and/or game controller, and an output device 214, such as a display. The processor 212 of the client 110 is configured to execute instructions, such as instructions physically coded into the processor 212, instructions received from software in the memory 220, or a combination of both. The processor 212 of the client 110 executes instructions from the communication application 222 causing the processor 212 to transmit user inputs and data from the communication application 222 to the server 130 via the communications module 218. The user 170, via the communication application 222 being executed on client 110, interacts with the user authentication engine 240, the communication engine 242, the session management engine 244, and the user profile engine 246.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 3:
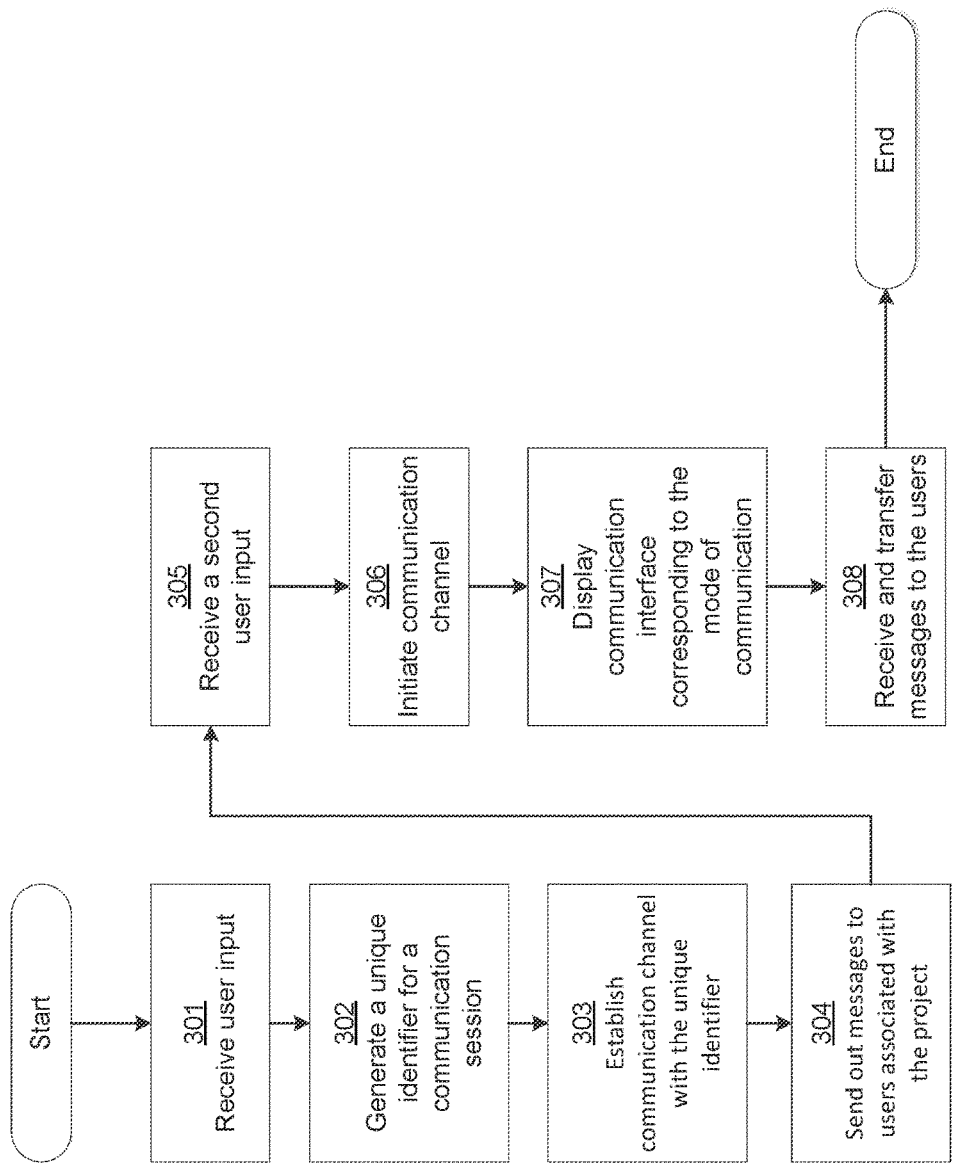
FIG. 3 illustrates an example process for a virtual on-set communication between two or more users using the example server of FIG. 2.

FIG. 3 illustrates an example process 300 of establishing and presenting virtual on-set communication between the users 170 associated with a project using a computing device executing an instance of the communication application, such as client 110 executing communication application 222 of FIG. 2. For explanatory purposes, the example process 300 is described herein with reference to the processors 212 and 236 of FIG. 2. However, the example process 300 is not limited to the processors 212 and 236 of FIG. 2, and one or more blocks of the example process 300 may be performed by one or more other components of the server 130, including user authentication engine 240, session management engine 244, communication engine 242, user profile engine 246. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed. For purposes of explanation of the subject technology, the process 300 will be discussed in reference to FIG. 2.

At step 301, the session management engine 244 of server 130 receives a user input from a user 170, such as user 170a, that indicates that the user 170a is ready to start working on the project. The input may be provided via graphical icon displayed in a communication application on a client device 110. The server 130 may receive the user inputs from the client 110, such as the client 110a. The server 130 may present or cause a GUI, configured for user input, on a client, such as a client 110a in order to allow a user, such as user 170a, to make the selection that indicates that the user 170a is ready to start working on the project. The user, such as user 170a, may provide his or her user preferences, selection of a project to work on, communicate messages, and the like using the GUI displayed on the client 110a and the user 170a selections are transmitted to the server 130 via network 150. The user selections, user preferences, and the like of the users are stored in a storage unit, such as user data 250.

At step 302, in response to receiving a user selection that the user is ready to start working on the project, the session management engine 244 of the server 130 generates a unique identifier for a communication session between the user that provided that selection and at least one other user 170 associated with that project. As described above, the session management engine 244 may identify users associated with a project based on a project identifier. At step 303, the session management engine 244 establishes a communication channel for the communication session and associates it with the unique identifier of the session. At step 304, the session management engine 244 sends out messages to users associated with the project. As described above, the messages to the users notify the users that a user is ready to start working on the project.

At step 305, the session management engine 244 receives a user input from a user to whom a message was sent in step 304. The user input may be a selection of a link provided in the message sent in step 304. At step 306, in response to receiving the user input from a user to whom a message was sent, the session management engine 244 initiates the communication channel to enable the communication between the user that provided the input that he or she is ready to start working on the project and the user that provided the input to whom a message was sent. The session management engine 244 may add other users to the communication channel as the session management engine 244 receives inputs from the other users to whom message was sent in step 304.

At step 307, the communication engine 246 causes a communication user interface, such as a GUI, corresponding to the mode of communication selected for the communication channel. For example, if a mode of communication is video communication, then one or more users that are talking may be displayed on the GUI. Similarly, if the mode of communication is audio communication, then one or more graphical icons for audio controls may be displayed on the GUI. At step 308, the server 130, using the session management engine 244 and the communication engine 242 receives and transmits messages between the users of the communication channel.

In some implementations, the user 170 that provided the input that he or she is ready to start working on the project may generate content or capture one or more images or one or more stream of images using an image capture device that may be communicatively coupled with client 110 of the user 170. For example, the image capture device may be communicatively paired with the client 110 via a wireless communications network. In some implementations, the image capture device may be configured to transfer the generated content or one or more images to the client 110 and the client 110 may be configured to transfer the generated content or the one or more stream of images to the server 130. The image capture device may be configured to transfer the generated content or the one or more stream of images to the server 130 while the user 170 is capturing the generated content or the one or more stream of images, and the server 130 may be configured to receive the generated content or the one or more stream of images while the content is being generated or the one or more stream of images are being captured.

In some implementations, the image capture device may be communicatively coupled to the server 130 directly and the image capture device 130 may be configured to transfer directly to the server 130 the generated content or the one or more stream of images while the content is being generated or the one or more stream of images are being captured. The server 130 may be configured to associate the received content or the one or more stream of images with the project on which the user 170 indicated that he or she is ready to work. The server 130 may be configured to associate the generated content or the one or more stream of images with the project based on an identifier associated with the client 110 that transferred the content or the one or more stream of images to the server 130. In implementations where the image capture device is communicatively coupled to the server 130, the server 130 may store in memory identification information associated with the image capture device and the user 170, and the server 130 may associate the received content or one or more stream of images with the project based on the stored identification information associating the image capture device and the user 170.

The server 130 may be configured to transfer the received content or the one or more stream of images to the users identified as being associated with the project. The server 130 may receive, from the users associated with the project, one or more messages related to the transferred content or the one or more stream of images. The messages may provide feedback on the content or the one or more stream of images to the user 170 that provided input that he or she is ready to start working on the project and that generated the content or captured the one or more stream of images. The server 130 may transmit the received messages to the user 170.

FIG. 3 set forth an example process 300 of establishing and presenting virtual on-set communication between the users 170 associated with a project using a computing device executing an instance of the communication application, such as client 110 executing communication application 222 of FIG. 2, and/or a server, such as server 130, executing one or more modules or engines of communication application, such as the user authentication engine 240, communication engine 242, session management engine 244, or user profile engine 246. An example will now be described using the example process 300 of FIG. 3 to describe how virtual on-set communication will be established between a content producer, such as a freelance content producer, and other stakeholders of a content production project. As described above, the process begins at step 301, where a content producer after arriving at a location for the project, provides an input on a computing device configured for communication, such as a smartphone of the content producer. The input provided by the content producer is transferred to a server with which the smartphone is communicatively coupled, such as the server 130. The server 130 receives the user input.

At step 302, the server 130 generates a unique identifier for a communication session between the content producer and other stakeholders of the content project in response to receiving the input from the content producer. At step 303, the server 130 establishes a communication channel between the content producer and other stakeholders of the content project. At step 304, the server 130 sends out messages to the computing devices of the content producer and/or other stakeholders of the content project to notify the other stakeholders of the content project that the content producer is ready to start working on the content project. The message may include a link, the selection of which will include the user that selects the link in the communication channel. At step 305, the server 130 receives a second input from one or more users, such as the content producer or other stakeholders of the content project that received the message in step 304.

At step 306, the server 130 initiates communication channel for communication between the content producer and the stakeholders of the content project. At step 307, the server 130 causes a communication interface, such as a GUI that is configured to receive inputs from users in the communication channel, such as the content producer and/or other stakeholders of the content project, to be displayed on the computing devices of the content producer and/or other stakeholders of the content project used for communication. At step 308, the server 130 receives and transfers messages from and to the computing devices of the content producer and other stakeholders of the content project used for communication.

Hardware Overview

Figure 4:
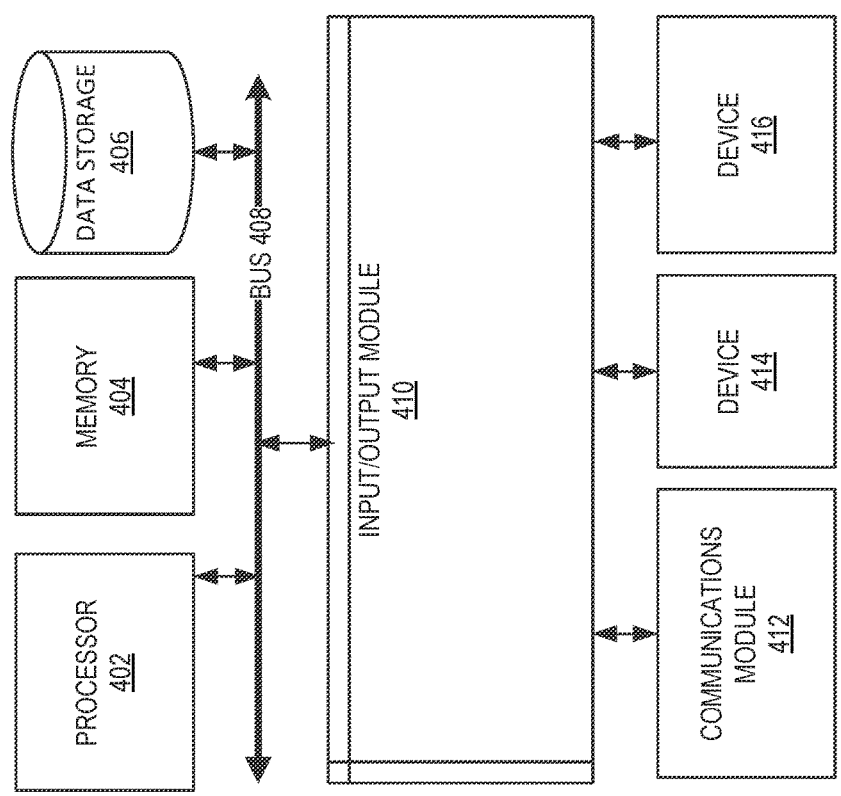
FIG. 4 is a block diagram illustrating an example computer system with which the clients and servers of FIG. 2 can be implemented.

FIG. 4 is a block diagram illustrating an example computer system 400 with which a client 110, such as client 110a, client 110b, client 110c, or client 110d, and a server 130, such as server 130a, and/or server 130b, of FIG. 2 can be implemented. In certain aspects, the computer system 400 may be implemented using hardware or a combination of software and hardware, either in a dedicated server, or integrated into another entity, or distributed across multiple entities.

Computer system 400 (e.g., client 110a, and server 130) includes a bus 408 or other communication mechanism for communicating information, and a processor 402 (e.g., processor 212, 252, 236) coupled with bus 408 for processing information. According to one aspect, the computer system 400 can be a cloud computing server of an IaaS that is able to support PaaS and SaaS services. According to one aspect, the computer system 400 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs)

that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 400 may be implemented with one or more processors 402. Processor 402 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 220, and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry. Expansion memory may also be provided and connected to computer system 400 through input/output module 410, which may include, for example, a SIMM (Single In Line Memory Module) card interface. Such expansion memory may provide extra storage space for computer system 400, or may also store applications or other information for computer system 400. Specifically, expansion memory may include instructions to carry out or supplement the processes described above, and may include secure information also. Thus, for example, expansion memory may be provided as a security module for computer system 400, and may be programmed with instructions that permit secure use of computer system 400. In addition, secure applications may be provided via the SIMM cards, along with additional information, such as placing identifying information on the SIMM card in a non-hackable manner.

The instructions may be stored in the memory 404 and implemented in one or more computer program products, e.g., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices (e.g., input device 216, output device 214). The input/output module 410 can be any input/output module. Example input/output modules 410 include data ports such as USB ports. In addition, input/output module 410 may be provided in communication with processor 402, so as to enable near area communication of computer system 400 with other devices. The input/output module 410 may provide, for example, wired communication in some implementations, or wireless communication in other implementations, and multiple interfaces may also be used. The input/output module 410 is configured to connect to a communications module 412. Example communications modules 412 (e.g., communications module 218, 258, and 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 412 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 412 sends and receives electrical, electromagnetic, or optical signals that carry digital data streams representing various types of information. The network link typically provides data communication through one or more networks to other data devices. For example, the network link of the communications module 412 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 412, which carry the digital data to and from computer system 400, are example forms of transmission media.

Computer system 400 can send messages and receive data, including program code, through the network(s), the network link, and communications module 412. In the Internet example, a server might transmit a requested code for an application program through the Internet, the ISP, the local network, and communications module 412. The received code may be executed by processor 402 as it is received, and/or stored in data storage 406 for later execution.

In certain aspects, the input/output module 410 is configured to connect to a plurality of devices, such as an input device 414 (e.g., input device 216) and/or an output device 416 (e.g., output device 214). Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 416 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 416 may comprise appropriate circuitry for driving the output device 416 to present graphical and other information to a user.

According to one aspect of the present disclosure, the client 110A can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. Processor 402 may process the executable instructions and/or data structures by remotely accessing the computer program product, for example by downloading the executable instructions and/or data structures from a remote server through communications module 412 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that participates in providing instructions or data to processor 402 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 408. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
   receiving, from a device of a first user, an input indicating that the first user is ready to start working on a project associated with the first user;
   identifying, based on the project associated with the first user, a second set of users associated with the project;
   generating a session identifier for a communication channel between the first user and one or more users of the second set of users;
   selecting, based on a listing of communication mode preferences associated with the first user, a mode of communication for the communication channel;
   generating messages for the communication channel, wherein the messages include a link to the communication channel;
   transmitting the messages to the one or more users of the second set of users;
   receiving one or more stream of images from the device of the first user while the one or more stream of images are being captured by an image capturing device of the first user;
   transmitting the one or more stream of images to the second set of users; and
   receiving, from a device of a user from the second set of users, one or more messages related to the one or more stream of images.

2. The computer-implemented method of claim 1, further comprising:
   selecting, based on a strength of a communication signal between the device of the first user and a communication service provider, a mode of communication for the communication channel.

3. The computer-implemented method of claim 2, further comprising:
   determining whether the strength of the communication signal between the device of the first user and the communication service provider satisfies a threshold communication signal level; and
   in response to determining that the strength of the communication signal satisfies the threshold communication signal level:
      changing the mode of communication for the communication channel to a second mode of communication.

4. The computer-implemented method of claim 3, wherein the mode of communication is video communication and the second mode of communication is audio communication.

5. The computer-implemented method of claim 3, wherein the mode of communication is audio communication and the second mode of communication is video communication.

6. The computer-implemented method of claim 3, wherein the mode of communication is video communication and the second mode of communication is text communication.

7. The computer-implemented method of claim 1, further comprising:
   selecting, based on a listing of communication mode preferences associated with the first user and a strength of a communication signal between the device of the first user and a communication service provider, a mode of communication for the communication channel.

8. The computer-implemented method of claim 1, further comprising:
   receiving, from a device of a user of the second set of users, a second input to initiate communication with the first user; and
   initiating communication between the user of the second set of users and the first user.

9. A system comprising:
   a memory storing sequences of instructions; and
   a processor configured to execute the sequences of instructions, which when executed, cause the processor to perform:
      receiving, from a device of a first user, an input indicating that the first user is ready to start working on a project associated with the first user;
      identifying, based on the project associated with the first user, a second set of users associated with the project;
      generating a session identifier for a communication channel between the first user and one or more users of the second set of users;
      selecting, based on a listing of communication mode preferences associated with the first user, a mode of communication for the communication channel;
      generating messages for the communication channel, wherein the messages include a link to the communication channel;
      transmitting the messages to the one or more users of the second set of users;
      receiving one or more stream of images from the device of the first user while the one or more stream of images are being captured by an image capturing device of the device of the first user;
      transmitting the one or more stream of images to the second set of users; and
      receiving, from a device of a user from the second set of users, one or more messages related to the one or more stream of images.

10. The system of claim 9, comprising stored sequences of instructions, which when executed by the processor, cause the processor to perform:
    selecting, based on a strength of a communication signal between the device of the first user and a communication service provider, a mode of communication for the communication channel.

11. The system of claim 10, comprising stored sequences of instructions, which when executed by the processor, cause the processor to perform:
   determining whether the strength of the communication signal between the device of the first user and the communication service provider satisfies a threshold communication signal level; and
   in response to determining that the strength of the communication signal satisfies the threshold communication signal level:
      changing the mode of communication for the communication channel to a second mode of communication.

12. The system of claim 11, wherein the mode of communication is video communication and the second mode of communication is audio communication.

13. The system of claim 12, wherein the mode of communication is audio communication and the second mode of communication is video communication.

14. The system of claim 12, wherein the mode of communication is video communication and the second mode of communication is text communication.

15. The system of claim 9, comprising stored sequences of instructions, which when executed by the processor, cause the processor to perform:
   selecting, based on a listing of communication mode preferences associated with the first user and a strength of a communication signal between the device of the first user and a communication service provider, the mode of communication for the communication channel.

16. The system of claim 9, comprising stored sequences of instructions, which when executed by the processor, cause the processor to perform:
   receiving, from a device of a user of the second set of users, a second input to initiate communication with the first user; and
   initiating communication between the user of the second set of users and the first user.

17. A non-transitory machine-readable storage medium comprising machine-readable instructions, which when executed by a processor, cause the processor to perform a method comprising:
   receiving, from a device of a first user, an input indicating that the first user is ready to start working on a project associated with the first user;
   identifying, based on the project associated with the first user, a second set of users associated with the project;
   generating a session identifier for a communication channel between the first user and one or more users of the second set of users;
   selecting, based on a strength of a communication signal between the device of the first user and a communication service provider, a mode of communication for the communication channel;
   generating messages for the communication channel, wherein the messages include a link to the communication channel;
   transmitting the messages to the one or more users of the second set of users;
   receiving one or more stream of images from the device of the first user while the one or more stream of images are being captured by an image capturing device of the device of the first user;
   transmitting the one or more stream of images to the second set of users; and
   receiving, from a device of a user from the second set of users, one or more messages related to the one or more stream of images.

18. The non-transitory machine-readable storage medium of claim 17, comprising machine-readable instructions, which when executed by a processor, cause the processor to perform a method comprising:
   determining whether the strength of the communication signal between the device of the first user and the communication service provider satisfies a threshold communication signal level; and
   in response to determining that the strength of the communication signal satisfies the threshold communication signal level:
      changing the mode of communication for the communication channel to a second mode of communication.

19. The non-transitory machine-readable storage medium of claim 17, comprising machine-readable instructions, which when executed by a processor, cause the processor to perform a method comprising:
   selecting, based on the strength of the communication signal and a listing of communication mode preferences associated with the first user, the mode of communication for the communication channel.

* * * * *